Jan. 26, 1960  G. L. HOBROUGH ET AL  2,923,003
ECHO QUALITY INDICATOR AND METHOD FOR RADAR
SYSTEMS USING CENTRE REFERENCE PULSES
Filed May 7, 1957  2 Sheets-Sheet 1

Inventors
GILBERT L. HOBROUGH
WILLIAM V. O'LEARY by: J. Richard Cavanagh

Patent Agent

Inventors
GILBERT L. HOBROUGH
WILLIAM V. O'LEARY by: J. Richard Cavanagh

Patent Agent

United States Patent Office 2,923,003
Patented Jan. 26, 1960

2,923,003

ECHO QUALITY INDICATOR AND METHOD FOR RADAR SYSTEMS USING CENTRE REFERENCE PULSES

Gilbert Louis Hobrough, Oshawa, Ontario, and William Victor O'Leary, Ajax, Ontario, Canada, assignors to The Photographic Survey Corporation Limited, Toronto, Ontario, Canada Application May 7, 1957, Serial No. 657,617

8 Claims. (Cl. 343—13)

This invention relates to a method and apparatus for determining the quality of a radar echo pulse, whereby the reliability of received information may be ascertained.

In any radar system of the kind employed as an altimeter for aerial survey purposes, a condition of multiple echoes renders the received information unreliable. According to prior practice, visual inspection of terrain photographs is employed to determine the reliability of the received and recorded terrain profile information. Prior radar systems used for this type of survey work generally employ a square wave pulse which may be distorted in width due to multiple echoes. Such width distortion is difficult to discriminate or measure and therefore little or no attempt has been made heretofore to overcome the problem of echo reliability except by way of perfecting already existing systems as to quality and uniformity of signal generation, transmission, reception and handling.

So-called "centre reference pulses" have been used heretofore for radar signals in radar systems. It is a characteristic of centre reference pulses of a form comprising a mirror image about the peak value centre reference time instant that the more reliable the received information therein, the narrower will be the received pulse. Theoretically, under ideal conditions, the received pulse will be identical in width to the transmitted pulse as, for example, in the case of the reflection of a signal pulse from a smooth reflecting terrain surface which is at right angles to the axis of the transmitted beam of radar pulses. Centre reference pulse signals are not generally employed in radar systems for the reason that leading reference pulses generally may be more cleanly handled in signal processing. Centre reference pulses tend to overshoot negatively through interstate coupling circuits. This characteristic is aggravated where the signal is passed through any coupling network having a high pass filter effect.

The present invention in part derives from the observation of the negative overshoot characteristic of a centre reference pulse on passing through a high pass filter coupling circuit. In a more specific sense, however, the invention recognizes that the amplitude of the negative overshoot is a function of pulse width.

It is therefore a main object of the present invention to provide a method and apparatus for indicating the reliability of information represented by a received radar echo pulse of the centre reference type.

It is a further object of the present invention to provide an improved radar system as set forth in which the measure of echo pulse width as a function of pulse information reliability is converted to an echo quality indicating signal adapted to energize an echo quality indicating device.

It is a still further object of the invention to provide an improved radar system as set forth in which the quality of the echo pulse is indicated on a pen recorder by varying the width of line made by the pen on the recorder in such manner that a minimum line width represents a maximum reliability of information.

It is a still further object of the present invention to provide an improved radar system for survey purposes adapted to provide a record of range as a measure of aircraft ground clearance height on a pen recorder or the like in which the width of the record line is varied responsive to the width of the received pulse and thus responsive to the reliability of received information.

Other objects of the invention will be appreciated by a study of the following specification taken in conjunction with the accompanying drawings.

Figure 5:
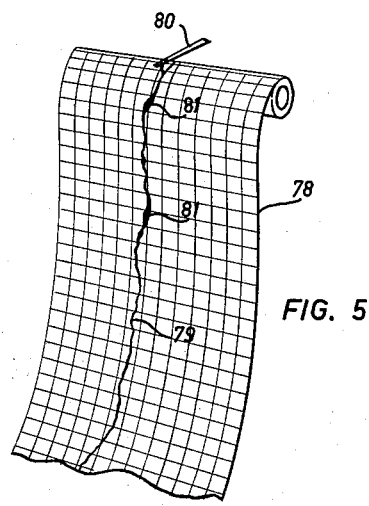
Figure 4:
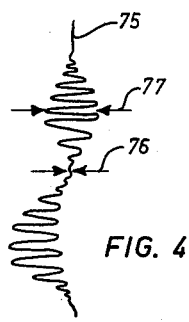
Figure 3:
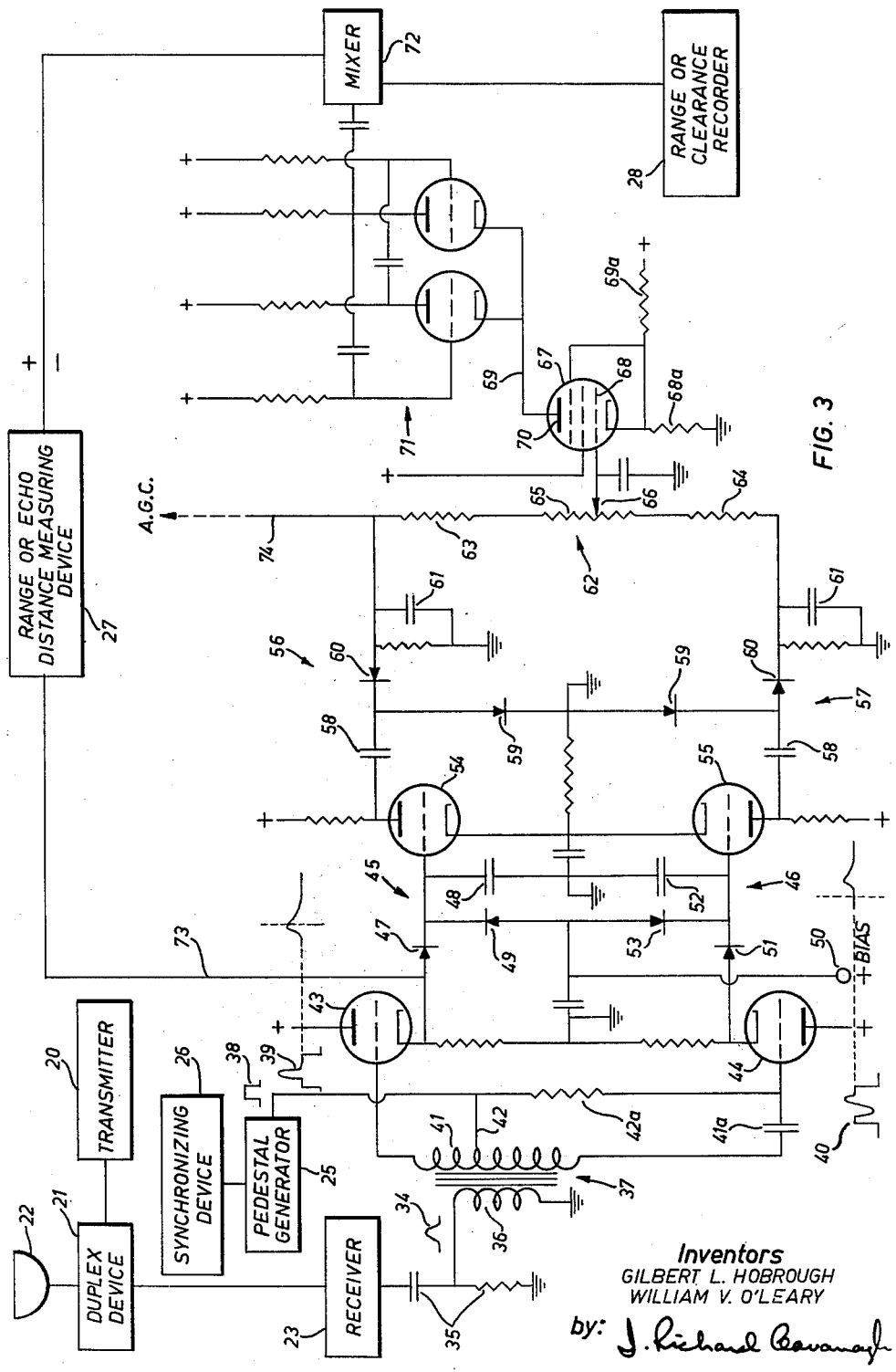
Figure 3 is an electronic schematic including block diagram portions of the echo quality measuring device of Figures 1 and 2.

Figure 4 illustrates in a vertically expanded manner and in enlarged form, the nature of a pen line which may be formed by a recording pen of a range indicating or clearance recorder as shown in Figure 3 responsive to the quality of received echo pulses; and Figure 5 is a perspective view of a recorder sheet and pen thereon indicating the general appearance of a line which may be formed by a recording pen according to the preferred practice of the invention.

Figure 1:
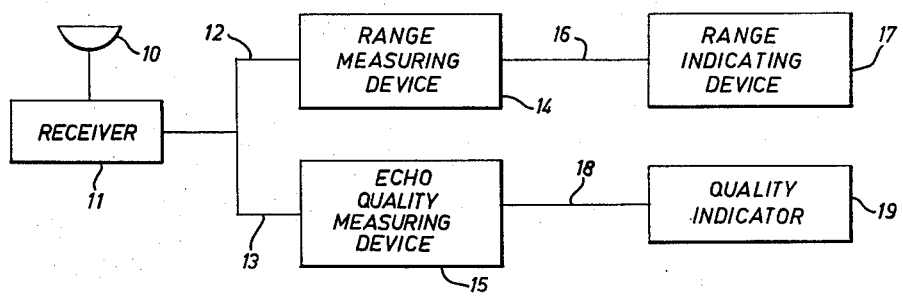
Figure 1 is a simplified block diagram of a radar receiving system having an echo quality indicator according to the invention.

In Figure 1, a suitable antenna 10 is adapted to receive radar echo pulses for the receiver 11 of a conventional design adapted to demodulate the same. The demodulated signal is fed by the lines 12 and 13 to a range or distance measuring device 14 and the echo quality measuring device 15. The range measuring device may be of any convenient well known form and delivers an output signal by line 16 to drive an image presenting range or distance indicating device 17 of any one of a well known number of forms such as, for example, a pen recorder, a radar cathode ray tube, a photograph film recorder or other convenient indicating or recording means. The echo quality measuring device of the invention is likewise responsive to the demodulated signal from the receiver 11 and provides a suitable signal responsive to echo quality information through line 18 to energize the quality indicator 19. The quality indicator may take any one of a number of forms according to preference of skilled persons.

Without intending to restrict the invention in any way, the details thereof will be set forth with reference to preferred practice utilizing centre reference radar pulses in which a quality indication is given by the width of a pen line of a pen recorder serving as a distance indicating device.

Figure 2:
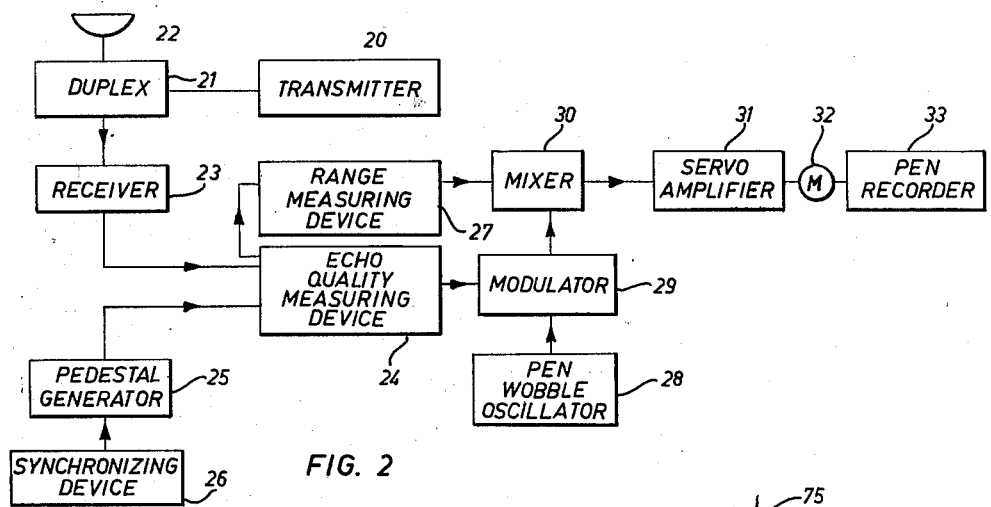
Figure 2 is a more detailed block diagram of the method and apparatus of the invention as applied to a radar receiving system for centre reference pulses.

Method and apparatus of the invention are shown in simplified practical block diagram form in Figure 2 for use in indicating the quality of information obtained for clearance distance measurement by centre reference pulse signal radar for aerial survey purposes. Thus, a transmitter 20 delivers centre reference pulses through a conventional duplexing unit 21 to a conventional radar antenna 22. The received echo pulse signals from the antenna 22 pass through the duplex unit 21 to a receiver or demodulating device 23 preferably of a crystal detecting type of conventional form.

The demodulated echo pulse from the receiver is superimposed by the echo quality measuring device 24 on a gating pulse above the level of noise and other pulses contained in the signal. Accordingly, a pedestal generator 25 provides the necessary pedestal or gating pulses on a time base controlled by a suitable synchronizing device 26, which latter may be operatively related to transmitter 20 in a manner well known.

The synchronizing device 26 may take the form of timing devices ordinarily operatively relating the timing of the transmitter pulse and the processing of the received echo pulses required to enable the extraction of information concerning echo time for conversion to distance measurement.

In the preferred practice of the invention the range or clearance height measuring device 27 obtains a substantially noise-free demodulated echo signal from the echo quality measuring device 24 and converts it to a direct current signal containing information with respect to clearance height of the aircraft above the ground surface. Such devices are known and may be provided to deliver a recorder actuating signal proportional to clearance height. The measuring device 27 may also be of a known form delivering an error signal driving the recorder to a null signal condition. Any and all such devices enabling a pen recorder to read clearance height or presenting some image giving range information are intended to be embraced by the device 27 regardless of the specific mode of operation thereof, which latter is of no critical importance to the present invention.

In the preferred practice of the invention, a pen wobble oscillator 28 operating at say five to ten cycles per second, depending upon record tape speed, is modulated in amplitude by modulator 29 responsive to the ratio of received echo pulse width to transmitted signal pulse width as determined by the echo quality measuring device 24. The thus modulated signal is mixed in signal mixing means 30 with the recorder actuating signal from the device 27 to provide a signal for the servo amplifier 31 which is of generally conventional form but which in addition, embodies alternating current components of wobble oscillator frequency but of quality indicating amplitude which, when driving the servo motor 32 operating the conventional pen recorder 33, effectively provides a change in line width produced by the recorder responsive to a change in echo signal quality.

A maximum echo signal quality corresponding to an ideal received echo pulse of minimum width, i.e., transmitted pulse width, will provide a minimum line width. A lesser quality will provide a roughly proportionally greater line width. Preferably, however, the line width is kept to a minimum and the signal from the echo quality measuring device 24 is biased to zero for received pulse widths less than about 1.10 times the transmitted pulse width. As an alternative, however, a specification may be placed upon a maximum line width permissible for useful information to be extracted from the pen recorder 33.

The invention is disclosed in more detail in Figure 3 wherein certain numerals from Figure 2 indicate like components. A demodulated centre reference signal 34 obtained from receiver 23 coupled by a conventional impedance match coupling 35 to the primary 36 of the ratio inverting transformer 37 is inverted by the latter to provide a two channel comparison system in which the signal pulse appears positively on the synchronized gate pulse 38 from pedestal generator 35 in the upper channel as shown at 39 and in the lower channel in the inverted position shown at 40. Since it is desired according to the invention to proportion the amplitudes of the pulse and the overshoot portion thereof to substantial equality with normal pulse width, the upper portion of the secondary 41 of transformer 37 is proportioned to establish the desired comparison ratio. A high pass filter is provided by condenser 41a and resistor 42a to develop a negative overshoot preferably in the lower channel only. The ratio tap 42 on transformer secondary 41 introduces the square wave pedestal signal 38 at a point dividing the secondary at the proper comparison ratio. The gating pulse 38 lifts the signal pulse 34 above the level of noise and other pulses contained in the echo signal beyond the signal pulse, the gating being synchronized by the device 26 with the signal pulse 34 at the transformer 37.

The triode tubes 43 and 44 each in conventional cathode follower connection are utilized for coupling the dual channel output of secondary 41 of transformer 37 to the dual channel low impedance diode pulse stretching networks 45 and 46. In the upper channel, the diode 47 and condenser 48 effect a pulse stretching function whereas diode 49 controlled by positive bias from a suitable source applied to the terminal 50 effects an amplitude discriminating control. Stretching diode 51, condenser 52 and discriminating diode 53 likewise effect a similar function for the signal in the lower channel.

The discriminating diodes 49 and 53 erase that portion of the signal below a predetermined threshold established by bias potential 50 to exclude the gate pedestal and noise. The output of the dual channel pulse discriminating networks 45 and 46 therefore comprises that portion of the signal pulse above threshold in the upper channel and that portion of the overshoot above threshold in the lower channel. The stretched pulses comprise the positive going portion above threshold of the signals entering the diodes 47 and 51 having added thereto the decay time of condensers 48 and 52 effecting a spreading of the trailing edge of the resulting signal thereby stretching the pulses to increase the time available for signal handling in following circuitry.

Triode amplifiers 54 and 55 amplify the stretched pulses in the upper and lower channels respectively and drive the following upper and lower full wave rectifying networks 56 and 57, each of which comprises a coupling condenser 58 and diode rectifying devices 59 and 60 in conventional full wave connection with condenser 61 for effecting full wave rectification. By this means, a negative potential (utilizable for automatic gain control) is provided in the upper channel as a function of signal pulse amplitude. Also, a positive potential is provided in the lower channel as a function of overshoot pulse amplitude.

The ratio of these potentials as a measure of pulse width may be utilized for echo quality indication. However, it is desired to use the term "ratio" loosely in this sense for it is convenient according to the invention to develop these potentials on a common output load 62 for both channels comprising resistors 63, 64 and fine adjustment potentiometer 65. The slider 66 of potentiometer 65 therefore picks off the difference by which one channel output exceeds the other by measuring the drift from zero potential.

The direct current amplifier tube 67 having direct current difference signal from slider 66 on its first grid 68 is series connected by line 69 from its plate 70 with a load consisting of an oscillator in the form of a symmetrical multivibrator 71 of well known design and operating at a frequency of about five to ten cycles per second. Resistors 68a and 69a bias the tube 67 to cut-off with grid 68 at ground potential. Grid 68 is preferably close to ground potential for conditions of acceptable echo pulse. Adjustment of potentiometer 65 enables a finer setting for the relative contribution of each channel to the direct current amplifier to render the output of the latter a minimum under conditions of just acceptable echo pulse width. Thus, a further increase in echo pulse width beyond the operating level thus obtained in conjunction with the ratio of transformer secondary tap 42 will produce a signal of higher amplitude in the lower channel as compared with that in the upper channel. Therefore, the positive output from rectifier 57 will exceed the negative output from rectifier 56 causing a net positive voltage to be developed on grid 68 of amplifier tube 67, thereby producing a signal from oscillator 71 of an amplitude which, when mixed with the signal from distance measuring device 27 at mixer 72, causes an observable wobble of the pen (not shown) of pen range or clearance recorder 28. In operation, therefore, the direct current amplifier 67 serves as a pulse width responsive series limiting resistance in the cathode circuit of the symmetrical multivibrator or oscillator 71 to responsively control the amplitude of oscillation.

The pen of the recorder moves responsive to clearance height of the survey aircraft above the ground surface and as the recording pen produces a line, the width of the line is varied by a lateral vibration of the pen at pen wobble oscillator frequency but at an amplitude which is a function of pulse width and hence a function of echo quality. As shown, it is preferred that the clearance measuring device obtains its input signal by line 73 from the cathode of the cathode follower amplifier coupling triode 43 whereby to eliminate noise and unwanted random signal content. It is also of interest to observe that a direct current signal may be obtained from an automatic gain control line 74 which is substantially ideal for use as an automatic gain control signal for the crystal receiver 23.

In Figure 4, an enlarged distorted view of a recorder or indicator image in the form of a pen line 75 is illustrated for the purpose of revealing the function of a recorder pen in accomplishing the objects of the invention. Assuming that the pen has moved in the upward direction on the sheet of drawing, an effective lateral change in line width will be evident. A minimum width is apparent at the arrow 76 corresponding to a maximum quality of echo signal of a width substantially equal to that of the transmitted pulse. However, the width of the pen line at the arrow 77 may represent an echo signal of unsatisfactory quality. In practice, the desired quality can be ascertained quite readily, as will be evident upon examination of Figure 5 wherein the recorder sheet 78 is shown having a pen line 79 thereon produced by pen 80 and of substantial width at regions 81 indicating that the received information is of unsatisfactory quality at such regions. As a result, the plotter will not rely solely upon the information from the recorder sheet 78 at such regions.

It will be apparent that instead of modifying the line width of the pen line 80, a separate pen may be provided giving an echo reading line along one margin of the recorder sheet 78. Many other modifications will be apparent to skilled persons having regard to the specific type of clearance height indicating device utilized. In the case of range measuring devices, indicating lights, audible signals or other means, may be energized responsive to an echo quality signal greater than a predetermined selected permissible value. It will be observed that the echo quality signal obtained herein has been utilized in the form of apparatus shown in Figure 3 as a controlling signal for the pen of the recorder. Likewise, the signal may be employed for other controlling purposes in range measuring equipment and the like where echo quality measurement may render radar range triggering devices inoperative except in response to signals of greater than a selected minimum quality specification.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

What we claim as our invention is:

1. Apparatus for determining the quality of a received radar echo pulse as compared with the quality of a corresponding transmitted radar pulse of the centre reference type and comprising, in combination: means for processing the received echo pulse to develop a negative overshoot characteristic portion thereon, the amplitude of said negative overshoot portion being a function of echo pulse width; means for discriminating the difference in the amplitude of said overshoot portion of said echo pulse as compared with the amplitude of said echo pulse; means providing an echo quality signal responsive to the discrimination of the difference of said amplitudes; and means responsive to said echo quality signal for indicating the quality of the echo pulse.

2. Apparatus for indicating the quality of a radar echo pulse obtained from an object reflection of a transmitted radar pulse of the centre reference type comprising, in combination: means for demodulating said echo pulse; means effecting a high pass filtering of said demodulated signal providing a negative overshoot signal portion on the latter of an amplitude proportional to the width of the demodulated echo pulse; dual channel amplifier means including an inverter for amplifying said demodulated pulse in both channels thereof to provide an overshoot signal portion in one channel of the same sign as said demodulated pulse in the other channel; means for differentially amplifying said demodulated signal and overshoot portion of same sign in said amplifier channels; and means providing an echo quality signal responsive to the amplitudes of said differentially amplified signals and hence proportional to the width of the echo pulse.

3. Apparatus for indicating the quality of a radar echo pulse obtained from an object reflection of a transmitted radar pulse of the centre reference type comprising, in combination: means for demodulating said echo pulse; means effecting a high pass filtering of said demodulated signal providing a negative overshoot signal portion on the latter of an amplitude proportional to the width of the demodulated echo pulse; dual channel amplifier means including an inverter for amplifying said demodulated pulse in both channels thereof to provide an overshoot signal portion in one channel of the same sign as said demodulated pulse in the other channel; means for differentially amplifying said demodulated signal and overshoot portion of same sign in said amplifier channels; and means adjusting said echo quality signal to a predetermined value responsive to a predetermined ratio of overshoot and echo pulse width corresponding to an ideal echo pulse of the same width as said transmitted pulse.

4. Apparatus for indicating the quality of a radar echo pulse obtained from an object reflection of a transmitted radar pulse of the centre reference type comprising, in combination: means for demodulating said echo pulse; means effecting a high pass filtering of said demodulated signal providing a negative overshoot signal portion on the latter of an amplitude proportional to the width of the demodulated echo pulse; dual channel amplifier means including an inverter for amplifying said demodulated pulse in both channels thereof to provide an overshoot signal portion in one channel of the same sign as said demodulated pulse in the other channel; means for differentially amplifying said demodulated signal and overshoot portion of same sign in said amplifier channels; and means responsive to said echo quality signal for indicating a change therein responsive to a change in the ratio of the overshoot portion of the echo pulse to the echo pulse.

5. Apparatus for indicating the quality of a radar echo pulse obtained from an object reflection of a transmitted radar pulse of the centre reference type comprising, in combination: means for demodulating said echo pulse; means effecting a high pass filtering of said demodulated signal providing a negative overshoot signal portion on the latter of an amplitude proportional to the width of the demodulated echo pulse; dual channel amplifier means including an inverter for amplifying said demodulated pulse in both channels thereof to provide an overshoot signal portion in one channel of the same sign as said demodulated pulse in the other channel; means for differentially amplifying said demodulated signal and overshoot portion of same sign in said amplifier channels; means for adjusting said echo quality signal to a predetermined value responsive to a predetermined ratio of overshoot and echo pulse width corresponding to an ideal echo pulse of the same width as said transmitted pulse; and means responsive to said echo quality signal for indicating a change therein responsive to a change in the ratio of the overshoot portion of the echo pulse to the echo pulse.

6. In pulse radar apparatus having a transmitter adapted to transmit short pulses of the centre reference type or the like and having an echo pulse receiver including a range indicator producing an image responsive to an energizing signal, the combination therewith of: means demodulating said received echo pulse; filter means providing a negative overshoot characteristic portion on said demodulated echo pulse, the amplitude of which in relation to the amplitude of said demodulated echo pulse represents a function of the width of said echo pulse; means differentially amplifying said demodulated echo pulse and the overshoot portion thereon and providing thereby a quality signal representing the ratio of the amplitudes thereof; and means associated with said range indicator and responsive to said quality signal for indicating the quality of image produced by said indicator.

7. In pulse radar apparatus having a transmitter adapted to transmit short pulses of the centre reference type or the like and having an echo pulse receiver including a range indicator producing an image responsive to an energizing signal, the combination therewith of: means demodulating said received echo pulse; filter means providing a negative overshoot characteristic portion on said demodulated echo pulse, the amplitude of which in relation to the amplitude of said demodulated echo pulse represents a function of the width of said echo pulse; means differentially amplifying said demodulated echo pulse and the overshoot portion thereon and providing thereby a quality signal representing the ratio of the amplitudes thereof; and means modifying said range indicator energizing signal responsive to said quality signal to provide an image having a quality characteristic indicating the quality of the received echo pulse.

8. In pulse radar apparatus having a transmitter adapted to transmit short pulses of the centre reference type or the like and having an echo pulse receiver including a range indicator producing an image responsive to an energizing signal, the combination therewith of: means demodulating said received echo pulse; filter means providing a negative overshoot characteristic portion on said demodulated echo pulse, the amplitude of which in relation to the amplitude of said demodulated echo pulse represents a function of the width of said echo pulse; means differentially amplifying said demodulated echo pulse and the overshoot portion thereon and providing thereby a qualtiy signal representing the ratio of the amplitudes thereof; means generating a wobble signal; means modulating said wobble signal responsive to said quality signal; and means mixing said modulated wobble signal and said range indicator energizing signal to provide an image having a wobble characteristic indicating the quality of the received echo pulse.

No references cited.